United States Patent Office 3,089,886
Patented May 14, 1963

---

3,089,886
CYCLOPENTADIENYL AND DI-ETHYL MALONYL TITANIUM COMPOUNDS
Heyme Breederveld, Bloemendaal, and Hein Israel Waterman, Delft, Netherlands, assignors to Shell Oil Company, a corporation of Delaware
No Drawing. Filed May 4, 1953, Ser. No. 352,974
Claims priority, application Great Britain May 5, 1952
19 Claims. (Cl. 260—429.5)

This invention relates to the production of organo-titanium compounds containing at least one titanium-carbon linkage in the molecule and to novel compounds thereby produced.

Organic titanium compounds such as titanium salts of organic acids are known. Certain complex titanium compounds derived from amines (British Patent No. 547,148) as well as certain oxygen-containing organic titanium compounds (V. M. Plec., J. Gen. Chem. (U.S.S.R.) 8 (1938), p. 1298) have been described heretofore. Attempts have been made to prepare stable organic titanium compounds containing a titanium-carbon linkage but these have generally not succeeded (cf. H. Gilman and R. G. Jones, J. Org. Chem. 10 (1945), pp. 505–6).

It has now been found that valuable organo-titanium compounds containing at least one organic radical linked directly to titanium by means of a titanium to carbon linkage are obtained by reacting a titanium halide with a compound providing a radical of strongly negative character under the reaction conditions.

As titanium halide starting material any of the combinations of halogen and titanium forming halogen compounds may be employed. In general the use of the chlorides and bromides of titanium are preferred.

Compounds reacted with titanium halides in accordance with the invention comprise broadly the class of compounds providing a radical of strongly negative character with a free carbon valence capable of reacting with a halide of titanium under the reaction conditions. Suitable compounds are those providing the radical represented by the empirical formula

  (I)

wherein Y and Y' each represent the same or a different polar group such as for example:

Esterified-carboxyl —COOR
Keto- —COR
Carbamyl —CO(NH$_2$)

and the like, wherein R represents a hydrocarbyl group such as an alkyl, alkylene, aryl or aralkyl radical. In the foregoing empirical Formula I

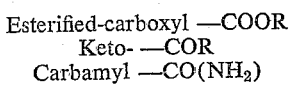

the groups Y and Y' may be connected to form together with the carbon atom of the substituted methylene group a closed carbocyclic or heterocyclic ring structure. Strongly negative radicals of the foregoing description are provided by the compounds wherein the free bond of the Formula I

is satisfied by hydrogen in diene hydrocarbons such as cyclopentadiene, indene, fluorene; alkyl malonates such as diethyl malonate. In executing the process of the invention the compounds providing the negative radical (I)

may be employed in the form of a metal derivative thereof such as, for example, an alkali metal derivative, such as sodium or potassium derivative thereof. The metal derivative of the negative radical-yielding compounds may be formed in situ during the course of producing the desired products of the invention. Examples of such suitable alkali-metal derivatives of the negative radical-yielding compounds above-described are sodium diethyl malonate, potassium cyclopentadiene, etc.

By the terms "polar group," "negative radical" and terms of similar import are meant those radicals which possess the property of polarity or negativity as defined, for example, in the text by Branch and Calvin, "The Theory of Organic Chemistry," Prentice-Hall, Inc., New York (1941), chapter IV.

In accordance with the process of the invention the compound providing the strongly negative radical (I)

such as, for example potassium cyclopentadiene, sodium diethyl malonate, etc., are interacted in the presence of a suitable solvent such as, for example an aromatic hydrocarbon such as benzene, toluene, xylene, etc. The solvent may be added to either or both of the reactants before bringing them together. The temperature of reaction employed may vary to some extent in accordance with the specific charge materials and other operating conditions employed. In general temperatures in the range of from about 10° C. to the boiling temperature of the reaction mixture may be employed. When employing materials entering readily into reaction, relatively low temperatures maintained by external cooling, for example, in the range of from about 10° C. to about 30° C. may be employed followed by a completion of the reaction at more elevated temperatures, for example 30° C. to the boiling temperature of the resulting reaction mixtures. Means for cooling materials vaporized during the execution of the reaction and assuring the recycling of at least a part thereof, comprising for example coolers, reflux condensers and the like may be provided.

Reactants are combined in molar ratios governed to provide the desired product with respect to degree of substitution of available halide atoms in the titanium halide starting material. When complete substitution of the halogen atoms of the titanium halide is desired the negative radical-providing compound is preferably added in molecular excess.

Under the conditions described interaction of titanium halide and negative radical-providing compound will result with substitution of the halogen in the titanium halide by a negative radical and with the formation of a reaction mixture containing stable organo-titanium compounds containing at least one carbon to titanium linkage in the molecule.

Two or more different negative radical-yielding compounds may be employed as the negative-yielding reactant combined with the titanium halide in accordance with the invention. Similarly the titanium halide starting material may comprise two or more different halogen atoms.

The desired organo-titanium compounds are recovered from the reaction mixtures obtained in accordance with the invention by suitable separating means comprising one or more such steps as decantation, distillation, solvent extraction, evaporation, and the like. Thus, the resulting

reaction mixture may be freed of components which are lower boiling than the desired organo-titanium product, such as, for example, solvent, unconverted titanium halide, etc., by distillation. The organo-titanium-containing distillation residue may be treated with a suitable solvent such as, for example, ethylether to selectively dissolve organo-titanium compounds leaving by-products of the reaction, such as alkali metal halide salts, in the solid state. The solution containing organo-titanium compounds is separated from the salt-containing by-products by the decantation, filtering or the like. Solvent is recovered from the solution of organo-titanium compound to yield the desired product by such steps as evaporation, distillation, extractive distillation or the like. It is to be understood that the invention is not limited to the use of any specific method of separating the desired organo-titanium compounds from the crude reaction mixture, and that considerable variation in operational procedures used to effect product separation and recovery may be resorted to as apparent to one skilled in the art without departing from the spirit and scope of the invention.

The compounds of the present invention may be employed as starting or intermediate materials in the production of valuable chemical derivatives therefrom. As stated in British patent application Serial No. 11,275/52, filed May 5, 1952, to which reference is made in applicants' oath, the organic titanium compounds of the invention are useful for water-proofing. They may furthermore be employed as components and addition agents in the production of catalytic materials and surface coatings. Particularly suitable are those compounds produced in accordance with the invention in which complete replacement of the halogen atoms attached to the titanium atom has taken place. A particular advantage of these compounds is the substantially complete absence of any formation of strongly acidic components upon their decomposition in the presence of water.

The following examples are illustrative of the invention.

*Example I*

58.5 grams of potassium metal were heated with 1200 milliliters of carefully dried benzene to a temperature just below the boiling temperature of benzene, the liquid being vigorously stirred. As a result of this procedure the potassium metal was dispersed to a finely granulated condition. The vessel was subsequently cooled and a solution of 99 grams of cyclopentadiene, freshly prepared by decomposition of the dimer, in 400 milliliters of carefully dried benzene are slowly added in approximately 2 hours' time while maintaining the temperature at approximately 15° C. by external cooling. Hydrogen gas escaped and a yellow-to-brown-colored slurry of potassium cyclopentadiene formed. At the end of the process the reaction mixture was heated to boiling temperature for a short time.

After cooling, a solution of 64.2 grams of titanium tetrachloride in 160 milliliters of benzene was slowly added to the liquid in the course of approximately one hour, the temperature being maintained at approximately 15° C. by further external cooling. A dark green solution was obtained from which the solvent was expelled by distillation in vacuo. 1 liter of carefully dried ether was added to the residue. A dark brown solution formed which was decanted from the undissolved potassium chloride.

Solid tetracyclopentadiene titanium was obtained as a brown residue upon evaporation of the solvent. Titanium content found: 15.60 percent by weight, calculated: 15.55 percent by weight.

There are indications that the compound is impure and partly present in polymerized condition.

*Example II*

109.5 grams of ethyl malonate which was freshly distilled and which had a boiling temperature of 112–115° C. (42.5 millimeters mercury pressure) were dissolved in 700 milliliters of carefully dried benzene. 14 grams of sodium metal wire was then added and the mixture was heated in a vessel with reflux condenser placed in an oil bath for approximately 5 hours at boiling temperature. A yellow paste consisting of sodium ethyl malonate formed.

After cooling to room temperature, a solution of 29 grams of titanium tetrachloride in 60 milliliters of benzene was slowly added during 30 minutes' time. The paste turned red and dissolved gradually while reaction heat was evolved. When the addition of titanium tetrachloride solution had been completed the reaction mixture was boiled with reflux condenser for ¾ hour. Benzene, and any unconverted titanium tetrachloride present, were removed by distillation at 50–60° C. under a pressure of 80 millimeters mercury. The paste-like residue was extracted with 0.5 liter of carefully dried ether.

A paste-like red product which did not contain any substantial proportion of chlorine was obtained upon evaporation of the ether. This product evidently consisted of a mixture of ethyl malonate titanium compounds. The titanium content was found to be approximately 10.50 percent by weight.

The ratio of carbon to hydrogen content in the product was 7.38; the ratio of oxygen to hydrogen content was 5.77. This is in fair agreement with theory which gives 7.58 and 5.77, respectively. Carbon, hydrogen and oxygen may, therefore, safely be assumed to be present in the form of ethyl malonate groups. The average number of such groups per titanium atom is 2.4 indicating the product to be a mixture of the ethyl malonate derivatives of divalent and trivalent titanium. A certain amount of polymers and condensates, however, appear to be present as well as evidenced for instance, from the molecular weight, which was ebullioscopically determined using benzene as the solvent and found to be approximately 720.

*Example III*

A solution of 190 grams of titanium tetrachloride in 400 milliliters of benzene was introduced in a flask provided with reflux condenser and stirrer. A solution of 182 grams of sodium diethyl malonate in 600 milliliters of benzene, prepared substantially as described in Example II, was then slowly added while stirring in the course of approximately one hour. A dark red solution formed from which benzene and some unconverted titanium tetrachloride were removed by means of a vacuum distillation. The residue was further heated for one hour in an oil bath of 120° C. under a pressure of 22 millimeters mercury,so as to eliminate all remaining traces of solvent.

After cooling the residue was extracted by contacting it with 1 liter of boiling ether for 3 hours. A wine-red clear ethereal solution was obtained which was decanted from undissolved solid material. After removal of the ether by distillation at 10° C. under reduced pressure and further heating at 125° C. under a pressure of 2 millimeters mercury 17.5 grams of a viscous residue was obtained, which solidified to a hard glassy brown mass upon cooling. The product contained a trace of sodium, 15.9 percent by weight of titanium, 30.2 percent by weight of chlorine and consisted essentially of mono(diethyl malonate) titanium trichloride.

The invention claimed is:

1. Compounds of the general formula $Ti(A)_n X_{(4-n)}$ wherein A is an organic radical of strong negative character selected from the group consisting of the cyclopentadienyl radical and the radical obtained by removing hydrogen from the alpha carbon atom of the malonyl group of an alkyl ester of malonic acid, said radical being linked to the titanium atom by a titanium to carbon bond, X is halogen and $n$ is an integer having a value of from 1 to 4 inclusive.

2. Compounds of the general formula $Ti(A)_n X_{(4-n)}$ wherein A represents the radical obtained by removing hydrogen from the methylene group linked directly to the carboxyl groups of alkyl malonic acid ester, X is halogen, and *n* is a whole number ranging from 1 to 4 inclusive.

3. Compounds of the general formula Ti(A)$_n$Cl$_{(4-n)}$ wherein A is the radical obtained by removing hydrogen from the methylene group linked directly to the carboxyl groups of ethyl malonate, and *n* is a whole number ranging from 1 to 4 inclusive.

4. Mono(diethyl malonate) titanium trichloride.

5. Di(ethyl malonate) titanium dichloride.

6. Tetracyclopentadiene titanium.

7. The process for the production of reaction mixtures comprising an organo-titanium compound having at least one covalent titanium-carbon bond selected from the group consisting of cyclopentadienyl titanium, cyclopentadienyl titanium halides, alkyl malonate titanium and alkyl malonate titanium halides, which comprises reacting titanium tetrahalide with a compound providing a radical of strongly negative character selected from the group consisting of the salts of an alkali metal selected from the group consisting of sodium and potassium with an electronegative organic compound selected from the group consisting of cyclopentadiene and alkyl esters of malonic acid.

8. The process for the production of reaction mixtures comprising an organo-titanium compound having at least one covalent titanium-carbon bond selected from the group consisting of alkyl malonate titanium and alkyl malonate titanium chlorides which comprises reacting titanium tetrachloride with a compound providing a radical of strongly negative character selected from the group consisting of the salts of an alkali metal selected from the group consisting of sodium and potassium with alkyl esters of malonic acid.

9. The process in accordance with claim 8 wherein said compound providing a radical of strong negative character is sodium diethylmalonate.

10. The process in accordance with claim 8 wherein said compound providing a radical of strong negative character is sodium ethylmalonate.

11. The process for the production of reaction mixtures comprising cyclopentadienyl titanium, which comprises reacting titanium tetrahalide with potassium cyclopentadiene.

12. The process for the production of reaction mixtures comprising cyclopentadienyl titanium which comprises reacting titanium tetrachloride with potassium cyclopentadiene.

13. The process for the production of organo-substitution products of titanium tetrahalide selected from the group consisting of cyclopentadienyl titanium, cyclopentadienyl titanium halides, ethylmalonate titanium and ethylmalonate titanium halides, which comprises reacting titanium tetrahalide with a compound providing a radical of strong negative character selected from the group consisting of the salts of an alkali metal selected from the group consisting of sodium and potassium with an electronegative organic compound selected from the group consisting of cyclopentadiene and ethyl ester of malonic acid, at a temperature of from about 10° C. to the boiling temperature of the resulting mixture, thereby replacing halogen of said titanium halide with a strongly negative radical selected from the group consisting of cyclopentadienyl radical and the radical remaining after removing said alkali metal from said malonic acid ester salt, and separating said organo-substitution products from the resulting reaction mixture.

14. The process for the production of organo-substitution products of titanium tetrachloride comprising ethyl malonate titanium and ethyl malonate titanium chlorides, which comprises reacting titanium tetrachloride with a sodium ethyl malonate at a temperature of from about 10° C. to about the boiling temperature of the resulting mixture, thereby replacing chlorine in said titanium tetrachloride with the ethyl malonate radical remaining after removing sodium from said sodium ethyl malonate, and separating said organo-substitution products of titanium tetrahalide from the resulting reaction mixture.

15. The process for the production of organo-substitution products of titanium tetrachloride selected from the group consisting of cyclopentadienyl titanium and cyclopentadienyl titanium chlorides, which comprises reacting titanium tetrachloride with potassium cyclopentadiene at a temperature of from about 10° C. to about the boiling temperature of the resulting mixture, thereby replacing chlorine in said titanium tetrachloride with cyclopentadienyl radicals, and separating the resulting organo-substitution products of titanium tetrachloride from the resulting reaction mixture.

16. The process for preparing a cyclopentadienyl titanium halide comprising reacting (1) an alkali metal cyclopentadiene, RM, wherein R is the cyclopentadienyl radical and M is an alkali metal with (2) a titanium tetrahalide.

17. An organo trihalide having the formula:

RTiX$_3$ where R is the cyclopentadienyl radical, and X is a halogen selected from the group consisting of chlorine, bromine and iodine.

18. An organo-titanium compound of the formula (indenyl)$_n$TiX$_{4-n}$ wherein the cyclopentadienyl ring of the indenyl group is bonded directly to titanium, X is halogen, and *n* is an integer having a value of from 1 to 4 inclusive.

19. An organo-titanium compound of the formula (fluorenyl)$_n$TiX$_{4-n}$ wherein the cyclopentadiene ring of the fluorenyl group is bonded directly to titanium, X is halogen, and *n* is an integer having a value of from 1 to 4 inclusive.

References Cited in the file of this patent

Herman et al.: J. Am. Chem. Soc. 74, 2693 (1952), (received April 25, 1952).

Wilkinson: Journal American Chemical Society, vol. 75, February 1953, pp. 1011 and 1012. (Received January 15, 1953.)

Herman et al.: Journal American Chemical Society, vol. 74, p. 2693, May 20, 1952.